Patented Feb. 19, 1946

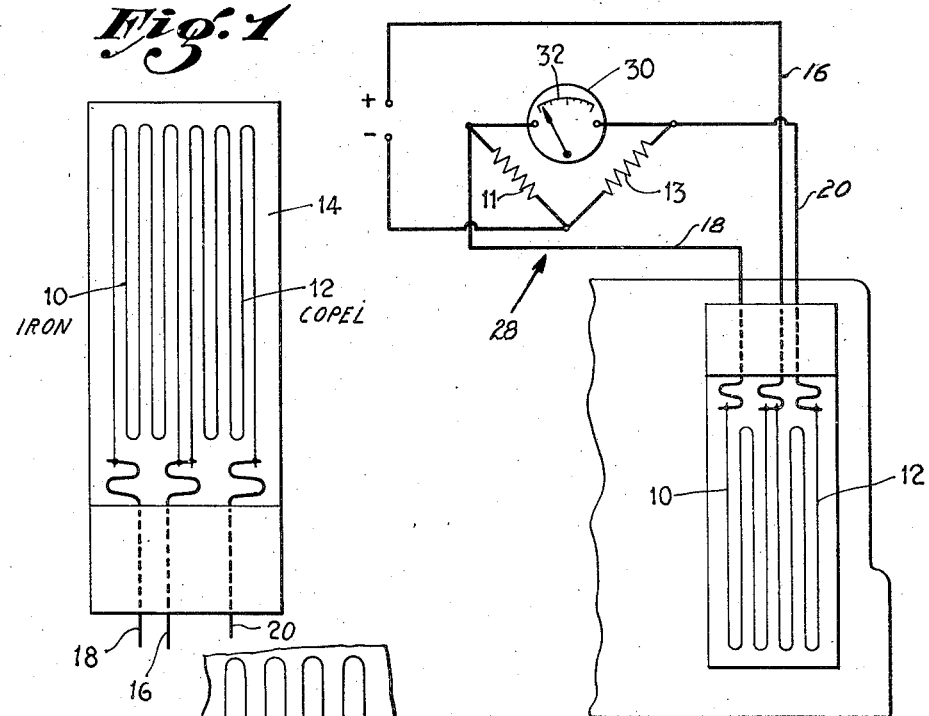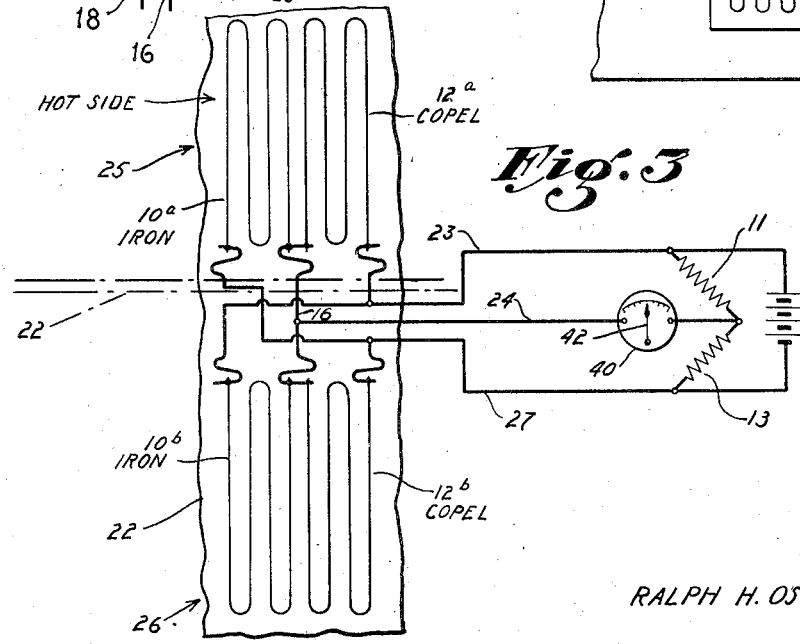

2,395,192

UNITED STATES PATENT OFFICE 2,395,192

RESISTANCE THERMOMETER

Ralph H. Ostergren, Los Angeles, Calif., assignor to Douglas Aircraft Company, Inc., Santa Monica, Calif.

Application January 17, 1944, Serial No. 518,669

7 Claims. (Cl. 73—342)

This invention relates to an improved temperature measuring means of the electrical resistance type, for medium temperatures, and for small temperature differences.

Resistance thermometers, as hitherto constructed, comprise a coil of fine resistance wire, usually platinum, wound on a support and protected by a covering such as a tube of metal. Such instruments, while very sensitive, are unsuitable for the measurement of rapidly fluctuating temperatures because of a time lag due to the time taken by the instrument to reach a stable temperature, and are unnecessarily cumbersome for medium temperature work.

It is the general object of this invention to provide a very simple and inexpensive resistance thermometer which, however, can record accurately rapid fluctuations of temperature, and minute differences in temperature.

In many cases occurring in aircraft manufacture, it is necessary to investigate the transfer of heat, for instance, through panels or heat interchangers, and the apparatus of this invention is ideally suited for such work.

An object of this invention is to provide temperature measuring means in the form of two lengths of fine resistance wire so connected that variations of resistance due to causes other than variation in temperature are cancelled out.

A further object of the invention is to provide temperature measuring means in the form of two lengths of fine resistance wire having different coefficients of increase of resistance with increase in temperature and arranged to cancel out changes in resistance due to bending stresses, and thus to secure an unusually sensitive thermometer.

A still further object of the invention is to provide a resistance thermometer of very small dimensions enabling it to be applied in many places in which it would be awkward to use any other form of thermometer.

Yet another object of the invention is to provide a resistance thermometer of such construction that it may be positioned with a maximum of ease at any point at which it is to be used.

Another object of the invention is to provide a resistance thermometer of very inexpensive construction yet of sufficient ruggedness to give satisfactory service.

Further features and objects of the invention may hereinafter appear in the following description and accompanying drawing in which preferred embodiments of the invention are given by way of example, but it is to be understood that the scope of the invention is not in any way limited by this descriptive showing but only as defined by the appended claims.

In the drawing:

Figure 1 is a face view, to an enlarged scale, of two grids of fine resistance wire arranged to function as temperature responsive means.

Figure 2 is a diagram showing how the instrument used in Figure 1 is arranged in an electrical indicating circuit.

Figure 3 is a view showing the arrangement of two temperature responsive means mounted on opposite sides of a panel to measure the heat flow through said panel, the resistance thermometer being shown on a relatively much enlarged scale, with the two sides of the panel developed to lie in a single plane for clearness.

While a single grid of resistance wire formed as later described may be used as a temperature sensitive device, it cannot be relied on to give satisfactory results because of interference from changes in resistance due to strains which might be set up under conditions of common occurrence, such as, for instance, might occur if the thermometer were mounted on a part which is distorted by stresses imposed thereon, or by stresses set up by changes in temperature.

As shown in Figure 1 the instrument comprises two grids of wire 10 and 12 cemented to a common backing 14. Each grid is made from a length of fine resistance wire of the order of from one to two mils in diameter wound into a grid formed by a plurality of closely spaced strands of wire, forming small loops connecting alternate pairs of wires at alternately opposite ends of the grid. One of the ends of each wire grid is connected to a common lead 16 and the remaining end of each grid to separate leads 18, 20.

The grids are cemented throughout their extent, including the point of attachment of the leads, to the backing 14, which may be a sheet of rice paper. The temperature measuring device can therefore be readily applied to any surface, whatever its contour, by cement, adhesive tape, or any other suitable securing means.

The wire from which one grid (10) is formed should preferably be made from a metal or an alloy with a good coefficient of increase of resistance with increase of temperature, but both wires should have the same coefficient of increase of resistance with strain. A suitable material having a high coefficient of increase of resistance with increase of temperature for a grid having a resistance of 100 ohms is "Balco" wire having a diameter of .001 inch.

The wire from which the other grid 12 is made should have a low or negative coefficient of increase of resistance with increase in temperature. A suitable material for the second grid having a resistance of 100 ohms is "Copel" wire having a diameter of .002 inch. This arrangement is effective to prevent a change in resistance, caused by strains in the wire structure of the instrument caused by stresses transmitted from the part on which it is mounted, introducing error in the instrument readings.

The two grids 10 and 12 are connected as two arms in a bridge circuit 28 as shown in Figure 2 in which 11 and 13 indicate standard resistances.

It is pointed out that in the circuit arrangement shown in Figure 2 one terminal of voltage supply to the indicating device is connected to the lead to which both grids 10 and 12 are connected, the other ends of the grids being connected to the standard resistances 11 and 13 respectively. The indicating instrument is connected across the point of connection of the grids 10 and 12 to the standard resistances, the arrangement being such that the current supplied divides between the paths constituted by grids 10, 11 as one branch and 12, 13 as another branch.

As the increase in resistance in each of these branches due to strain is substantially equal, the balance of the bridge is not affected by this cause, but since the coefficient of increased resistance with temperature of grid 10 is greater than that of the grid 12, the bridge circuit will be unbalanced, resulting in a deflection of a detecting instrument or galvanometer 30 in the bridge circuit. The amount of the deflection will be proportional to the rise in temperature and the detecting instrument dial 32 may therefore be calibrated directly in degrees of temperature.

In Figure 3, two of the temperature responsive resistance grids constructed according to the invention are shown arranged to measure the flow of heat through a panel 22 forming, for instance, a part of a casing enclosing a combustion heater, the construction being under test to determine the flow of heat through the panel. One resistance grid 25 is shown mounted on the hot side of the panel and a second 26 on the cooler side of the panel. The grids may be connected in a bridge circuit in various ways, for instance with the "Balco" wire 10a of grid 25 and the "Copel" wire 12b of the grid 26 in parallel forming one arm of the bridge, and the "Balco" wire 10b of the grid 26 with the "Copel" wire 12a of the grid 25 also in parallel forming a second arm of the bridge. It will be seen that lead 24 is connected to the lead 16, which joins on end of both "Balco" and "Copel" wires of both resistance grids 25 and 26, while lead 23 is connected to the "Copel" wire 12a of resistance grid 25 and the "Balco" wire 10b of resistance grid 26, while lead 27 is connected to the "Balco" wire 10a of resistance grid 25 and the "Copel" wire 12b of resistance grid 26. The object of providing the "Copel" wire grids in this utilization of the device is to provide for cancellation of errors that might otherwise arise due to bending of the test piece on which the device is mounted, and also avoid errors caused by changes in the ambient temperature.

The temperature difference existing between the two sides of the panel will cause an unbalance due to the different increase in resistance of the grids which will cause deflection of the indicating needle 42 of the detector instrument 40, which will be a measure of the heat flow through the panel.

It will be evident that the wire forming the grid can assume very rapidly the temperature of the surface with which it is in contact because of the extremely small volume of a unit length of wire, and because of the close contact of the grids of wire with the surface.

It is believed that the resistance thermometer of my invention provides a valuable advance in the field of medium and low range heat measurement, because the instruments are inexpensive, yet accurate and can replace much more expensive instruments. In addition, the instruments can be readily utilized in many locations in which it might be difficult to use the usual type of heat measuring instruments.

Various modfications and different embodiments of the resistance thermometer herein described may be made by those familiar with the art without departing from the scope of the invention, and I therefore claim any such modifications as fall within the scope of the appended claims.

I claim:

1. A resistance thermometer comprising: an element formed from a continuous length of fine resistance wire wound into a grid of a plurality of closely spaced parallel lengths of wire, and small loops positioned alternately at opposite ends of the grid; a second element formed from continuous length of fine resistance wire wound into a grid of closely spaced parallel lengths of wire, and small loops positioned alternately at opposite ends of the grid, both elements having substantially equal coefficients of change of resistance with strain, but having coefficients of change of resistance with temperature different from one another; a backing member of thin, heat-permeable material to which said wire grids are cemented throughout their extent; said two elements having one end of each connected to a common terminal; an electrical circuit in which said first and second resistance elements are connected in parallel, and an indicating instrument connected between said parallel circuits to indicate difference in potential caused by increased resistance of one element relatively to the other due to increase of temperature, said instrument thus serving to indicate temperature.

2. A resistance thermometer comprising: a first element formed from a continuous length of fine resistance wire wound into a grid of closely spaced parallel lengths of wire, and small loops positioned alternately at opposite ends of the grid; a second element formed from a continous length of fine resistance wire wound into a grid of closely spaced parallel lengths of wire and small loops positioned alternately at opposite ends of the grid, both elements having substantially equal coefficients of change of resistance with strain, but having coefficients of change of resistance with temperature different from one another; said two elements having one end of each connected to a common terminal; an electrical circuit in which said first and second resistance elements are connected in parallel, and an indicating instrument connected between said parallel circuits to indicate difference in potential caused by increased resistance of one element relatively to the other due to increase of temperature, said instrument thus serving to indicate temperature.

3. A resistance thermometer comprising: a first element formed of fine resistance wire; a second element formed of fine resistance wire, both elements having substantially equal coefficients of change of resistance with strain, but having coefficients of change of resistance with temperature different from one another; a backing member to which said wires are cemented throughout their extent; said two elements having one end of each connected to a common terminal; an electrical circuit in which said first and second resistance elements are connected in parallel, and an indicating instrument connected between said parallel circuits to indicate difference in potential caused by increased resistance of one element relatively to the other due to increase of temperature, said instrument thus serving to indicate temperature.

4. A resistance thermometer comprising: a first element formed of fine resistance wire; a second element formed of fine resistance wire, both elements having substantially equal coefficients of change of resistance with strain, but having coefficients of change of resistance with temperature different from one another; said two elements having one end of each connected to a common terminal; an electrical circuit in which said first and second resistance elements are connected in parallel, and an indicating instrument connected between said parallel circuits to indicate difference in potential caused by increased resistance of one element relatively to the other due to increase of temperature, said instrument thus serving to indicate temperature.

5. A resistance thermometer comprising: a first resistance element formed of electrically conductive material; a second resistance element formed of electrically conductive material, both elements having substantially the same coefficient of change of resistance with strain, but one element having a coefficient of change of resistance with temperature different from that of the other, said two elements having one end of each connected to a common terminal; an electrical circuit in which said first and second resistance elements are connected in parallel, and an indicating instrument connected between said parallel circuits to indicate difference in potential caused by increased resistance of one element relatively to the other due to increase of temperature, said instrument thus serving to indicate temperature.

6. A resistance thermometer arranged to measure heat flow through material along a definite path comprising: two resistance elements, each formed as two grids of fine wire having substantially the same co-efficient of change of resistance with strain, but one grid of each element having a coefficient of change of resistance with temperatures different from that of the other grid, one resistance element being arranged on the low temperature end of said path along which heat flow is to be measured; the other resistance element being arranged on the high temperature end of the path; an electrical bridge circuit including an indicator; the grids of each resistance element which have the same coefficient of change in resistance with change in temperature being connected together in parallel to one point of the bridge; the grids of each resistance element which have the same coefficient of change in resistance with change in temperature, which coefficient is different from the coefficient of change in resistance with change in temperature of the first mentioned grids, being also connected together in parallel and to the point of maximum difference of potential of said bridge with respect to the point of attachment of said first two grids; the unconnected ends of all four grids being connected together and to a point on said bridge intermediate the points of connection of each said pair of grids.

7. A resistance thermometer arranged to measure heat flow through material along a definite path comprising: two resistance elements each having the character described in claim 2, one resistance element being arranged on the low temperature end of said path along which heat flow is to be measured; the other resistance element being arranged on the high temperature end of the path; an electrical bridge circuit including an indicator; the grids of each resistance element which have the same coefficient of change in resistance with change in temperature being connected together in parallel to one point of the bridge; the grids of each resistance element which have the same coefficient of change in resistance with change in temperature, which coefficient is different from the coefficient of change in resistance with change in temperature of the first mentioned grids, being also connected together in parallel and to the point of maximum difference of potential of said bridge with respect to the point of attachment of said first two grids; the unconnected ends of all four grids being connected together and to a point on said bridge intermediate the points of connection of each said pairs of grids.

RALPH H. OSTERGREN.